H. A. DENMIRE.
PROCESS OF APPLYING WASHERS TO RUBBER HEEL MOLDS.
APPLICATION FILED JAN. 7, 1922. RENEWED OCT. 4, 1922.

1,435,218.

Patented Nov. 14, 1922.

Harold A. Denmire
*INVENTOR.*

BY

*ATTORNEY*

Patented Nov. 14, 1922.

1,435,218

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

PROCESS OF APPLYING WASHERS TO RUBBER HEEL MOLDS.

Application filed January 7, 1922, Serial No. 527,761. Renewed October 4, 1922. Serial No. 592,392.

*To all whom it may concern:*

Be it known that I, HAROLD A. DENMIRE, a citizen of the United States, residing at Akron, in the county of Summit, State of Ohio, have invented certain new and useful Improvements in Processes of Applying Washers to Rubber Heel Molds, of which the following is a specification.

In the general art or practice of manufacturing resilient heels from rubber or rubber-like compositions, it is customary to form nail holes ranged around the heel, the holes extending about one-half of the depth of the heel and having metallic washers or rings embedded in the heel at the bases of the holes, which washers afford a surface for engagement with the heads of the securing nails. To form the holes in the heels it is customary to provide pins in the lower plate of the mold, which pins form the holes in the heels and to provide the pins with shoulders or other means by which the washer is supported within the mold cavity. A block of uncured rubber is then placed in the heel mold and the mold closed, the pressure and heat of vulcanization causing the rubber to flow into the cavity and surround the washers, which are thus embedded in the heel.

The washers are sometimes flat pieces of metal or are hollowed or coned with the concave or depressed side of the washer facing the opening for the nail so that, should the nail be driven crooked or the washer be slightly displaced from its proper position, the concave or cone surface of the washer will guide the nail into the hole in the center thereof.

Although some progress has been made in the art in placing washers in rubber heel molds by machinery, the prevailing practice is to place the washers by hand, which is a hard task, owing to the small size of the washers, and the fact that the operator is compelled to work on hot molds. But whether the washers are placed by hand or by machinery, it is always a difficult thing to get them to face the same way on the pins. As explained before, the washers should be placed with the depressed or concave face toward the lower plate of the mold and it is frequently a very exasperating job to get them all to face in the same direction.

In view of the facts stated, I have devised a process of placing washers in rubber molds which will simplify the positioning of the coned washers so that this step in the manufacture of the articles will present no problem and the securing of coned washers, right side up, may be accomplished, whether by hand or by machinery, as easily as the placing of flat washers.

For this object the invention herein consists in steps which are described and illustrated in this application, it being understood that changes or modifications may be made in the exact following out of the invention without departing therefrom.

Briefly stated, my invention comprises the steps of placing the washers on the mold pins, either by machinery or by hand, while the washers are in flat condition, or in any condition but their final one, and then shaping the washers by any suitable means, so that they are coned or concaved while supported within the mold. In this manner the work accompanying the setting of the washers right side up is simplified.

In the drawings accompanying this application

1 represents a fragment of the lower plate of a heel mold in which the outline of the heel 2 is formed, it being understood that it is usual to provide a mold with a plurality of similar cavities. The nail-hole forming pins are indicated at 3 being shown in a conventional arrangement, with any suitable decorative or non-skid forming recesses 4 around the nail holes.

The pins 3 are shown as substantially cylindrical, although they may be given a slight draft or taper. The top of the pin may be reduced as shown at 5, so as to form a shoulder 6. The washer is indicated at 7, being shown as flat or substantially flat, and supported on the shoulder 6, with the top of the pin projecting through the hole.

Figure 1:
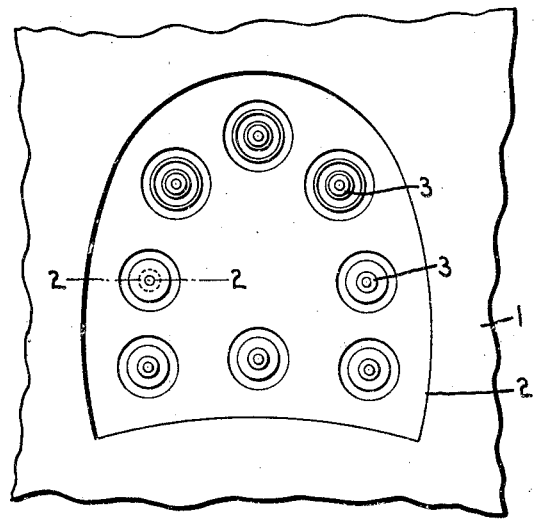
Fig. 1 shows a fragment of a heel mold.
Figure 2:
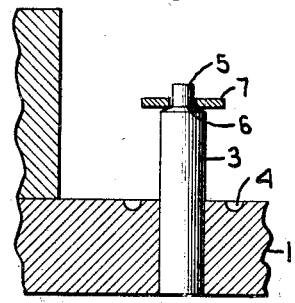
Fig. 2 is a section on the line 2—2 of Fig. 1, showing a flat washer in the place of the mold pin.
Figure 3:
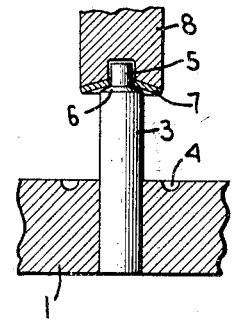
Fig. 3 is a similar view showing the washer in the act of being shaped or coned.
Figure 4:
Fig. 4 is a sectional view through a coned or shaped washer.

After being placed in position, the washer is deformed to give it the desired dish or concavity as shown in Fig. 4, the concavity being formed by any suitable tool or device, such as shown for example at 8 in Fig. 3, by which it is deformed from its original flat condition to the desired form. After the coning or dishing operation, which may be performed on all of the washers in a mold simultaneously, the mold is ready to receive the rubber for the vulcanizing operation.

It is obvious that the process of the invention may be carried out in a number of ways, the essential feature being that the washer is placed on the mold pin in a form which is easy to handle and does not require sorting or care as to the way in which they are faced, and then brought to the proper shape in an operation which may be performed over the whole of the mold surface at a single stroke, if desired. Nor is the invention necessarily limited to the manufacture of rubber heels, but may be extended to other or analogous uses.

Claims:

1. A process of placing washers in a rubber heel mold, comprising locating the washers upon the mold pins in one shape and forming them while on the pins, into their final shape.

2. A process of preparing molds for rubber heels or the like, said molds being provided with pins for forming the nail holes, comprising supporting washers on the mold pins while in flat condition, and then shaping the washers to cone form while on the pins.

3. A process of preparing molds for rubber heels or the like, said molds being provided with pins for forming nail holes, comprising placing the washers over the pins in one shape and then bringing them to coned form while located over the pins.

4. A process of preparing molds for rubber heels or the like, said molds being provided with shouldered pins for forming the nail holes, comprising placing the washers while flat over the pins and supported on the shoulders, and then pressing the washers into cone form.

5. A process of manufacturing molded articles such as rubber heels, having conical metallic inserts embedded therein, comprising supporting the inserts within the mold cavity while in flattened condition, and then coning them while they are so supported.

6. A process of manufacturing molded articles such as rubber heels, having conical metallic inserts embedded therein, comprising supporting the inserts within the mold cavity while in flattened condition and then coning all of said inserts simultaneously while they are so supported.

HAROLD A. DENMIRE.